United States Patent Office 3,658,863
Patented Apr. 25, 1972

3,658,863
6-METHOXY-2-NAPHTHYL COPPER(I)
Ian T. Harrison, Palo Alto, Calif., assignor to Syntex Corporation, Panama, Panama
No Drawing. Filed Sept. 30, 1969, Ser. No. 862,459
Int. Cl. C07f 1/08
U.S. Cl. 260—438.1        1 Claim

ABSTRACT OF THE DISCLOSURE 2-(6-methoxy-2-naphthyl)propionic acid is prepared by reacting 6-methoxy-2-naphthyl copper(I) with a lower alkyl 2-bromopropionate in a suitable solvent to form a lower alkyl 2-(6-methoxy-2-naphthyl)propionate, and hydrolyzing the ester group thereof. The product has anti-inflammatory, analgesic and anti-pyretic activities.

---

This invention relates to a process for preparing 2-(6-methoxy-2-naphthyl)propionic acid and an intermediate therefor.

In general, the process of this invention for preparing 2-(6-methoxy-2-naphthyl)propionic acid comprises reacting 6-methoxy-2-naphthyl copper(I) with a lower alkyl 2-bromopropionate in an inert organic solvent until a lower alkyl 2-(6-methoxy - 2 - naphthyl)propionate is formed; hydrolyzing the ester group of the 2-(6-methoxy-2-naphthyl)propionate; and recovering 2-(6-methoxy-2-naphthyl)propionic acid from the reaction mixture. Preferably, the product is resolved to yield d-2-(6-methoxy-2-naphthyl)propionic acid.

The process of this invention can be represented by the following formulas:

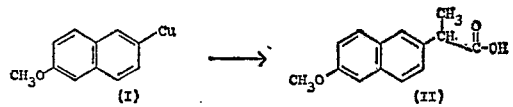

The term "lower alkyl" includes primary, secondary and tertiary alkyl groups of straight and branched chain configuration having up to 6 carbons. Examples are methyl, ethyl, propyl, isopropyl, n-butyl, i-butyl, t-butyl, n-pentyl, n-hexyl and the like.

The product of Formula II is prepared by reacting the compound of Formula I with at least 1 and preferably from 1 to 2 molar equivalents of a lower alkyl 2-bromopropionate in an inert organic solvent.

Suitable inert organic solvents for this reaction include ethers such as diethyl ether, tetrahydrofuran, tetrahydropyran, dimethoxyethane, and the like; aprotic solvents such as dimethylformamide, dimethylacetamide, and acetonitrile; and basic solvents such as pyridine, quinoline, collidine, lutidine and the like.

The reaction is carried out at a temperature of from 20 to 50° C. and preferably from 30 to 40° C. The time required for the reaction depends upon the reaction temperature, times of from 1 hour to 2 days usually being sufficient.

The 2-(6-methoxy-2-naphthyl)propionates formed in the above reaction are then hydrolyzed to form the free acid of Formula II by treatment with base followed by acidification or by treatment with a strong acid. Filtration of the reaction mixture to remove any residual solids formed in the reaction is preferred before any precipitation of the acid product occurs, that is, before acidification of the reaction mixture.

For basic hydrolysis, a solution of a strong base such as sodium or potassium hydroxide in a suitable solvent such as water is mixed with the reaction mixture, and the reaction mixture is maintained at a temperature of from 25° C. to reflux temperature until hydrolysis occurs.

Usually from 10 minutes to 6 hours is sufficient for this hydrolysis. The reaction mixture is then acidified with an acid such as acetic acid, trifluoroacetic acid, p-toluenesulfonic acid, hydrochloric acid, sulfuric acid, hydroiodic acid, hydrobromic acid, phosphoric acid, and the like to release the free acid.

Alternatively, the reaction mixture is mixed with a solution of a strong organic or inorganic acid such as trifluoroacetic acid, p-toluenesulfonic acid, hydrochloric acid, hydrobromic acid, hydroiodic acid, sulfuric acid, phosphoric acid and the like at a temperature of at least 60° C. and preferably from 90° C. to the boiling point of the mixture until the hydrolysis occurs. Usually from 5 to 24 hours are required for this hydrolysis. Suitable solvents for the acid include water, acetic acid, aqueous alcohols and the like. If acid hydrolysis is used, the free acid is formed directly. If necessary, the reaction mixture can be diluted with water to precipitate the product.

The product compound of Formula II is then separated from the reaction mixture by conventional techniques. For example, the reaction mixture can be extracted with ether or a similar organic solvent, the ether phase separated and evaporated to dryness, and the residue recrystallized from acetone-hexane to yield the compound of Formula II. Alternatively, the reaction mixture can be diluted with water, precipitating the compound of Formula II, and the precipitate can be removed by filtration, dried and crystallized from acetone-hexane. Chromatography can also be used to purify and/or isolate the product compound of Formula II.

The preferred product is d-2-(6-methoxy-2-naphthyl)propionic acid. To obtain this product, optical resolution of the compound of Formula II can be achieved by selective biological degradation or by preparation of diastereo isomer salts of the 2-(6-methoxy-2-naphthyl)propionic acid with a resolved optically active amine base such as cinchonidine, and then separating the thus formed diastereo isomer salts by fractional crystallization. The separated diastereo isomer salts are then acid cleaved to yield the respective d-2-(6-methoxy-2-naphthyl)propionic acid.

The compound of Formula I can be prepared by a procedure which can be represented as follows:

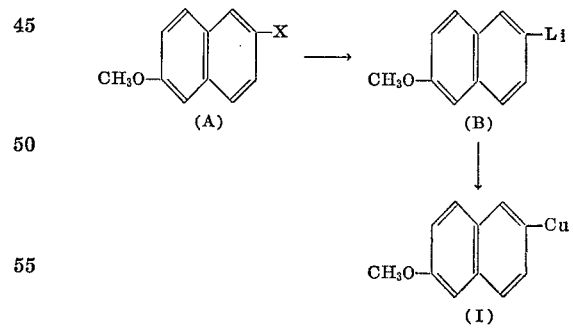

In the above formula, X is bromo, chloro, or iodo.

The compounds of Formula A are all known compounds. The compounds of Formula B are prepared by reacting the compounds of Formula A with lithium metal in an ether solvent at a temperature of from 0 to 65° C. until the compound of Formula B is formed, usually from 1 to 4 hours.

The compound of Formula B is then reacted with cuprous bromide in an ether solvent such as diethyl ether, tetrahydrofuran or tetrahydropyran at a temperature of from 0 to 40° C. until the compound of Formula I is formed, usually from 0.5 to 4 hours being sufficient.

The reaction mixture can then be filtered, if desired, and evaporated to dryness in vacuo while maintaining the solution temperature at less than 30° C. to yield the compound of Formula I.

The compound of Formula II exhibits anti-inflammatory, analgesic and anti-pyretic activities and is accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

This invention is further illustrated by the following specific but non-limiting examples.

EXAMPLE 1

A solution of 23 g. of 2-bromo-6-methoxynaphthalene in 100 ml. of tetrahydrofuran is slowly added to 1.4 g. of lithium metal in 100 ml. of tetrahydrofuran. When most of the lithium has reacted, 16 g. of cuprous bromide is added, and the suspension is stirred for 1 hour at about 20° C. to form 6-methoxy-2-naphthyl copper(I). The tetrahydrofuran is then removed in vacuo while maintaining the solution temperature at less than 30° C. to yield 6-methoxy-2-naphthyl copper(I).

A solution of 18 g. of ethyl bromopropionate in 50 ml. of dimethylformamide is added to the residue, and the mixture is heated to 40° C. for 24 hours. The solvent is then removed in vacuo, and the residue is hydrolyzed by heating under reflux for 1 hour with a solution of 10 g. of sodium hydroxide in 250 ml. of methanol. The alkaline solution is filtered, and the filtrate acidified with 2 N hydrochloric acid to yield 2-(6-methoxy-2-naphthyl)propionic acid which precipitates from the solution. The precipitate is filtered, and the filtered solids are dried and recrystallized from acetone-hexane.

EXAMPLE 2

A solution of dl-2-(6 - methoxy-2-naphthyl)propionic acid in methanol is prepared by dissolving 230 g. of the product of Example 1 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60° C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d-2-(6-methoxy-2-naphthyl)propionic acid.

I claim:
1. 6-methoxy-2-naphthyl copper(I).

References Cited

Chemical Abstracts, vol. 64, p. 12719h (1966).
Chemical Abstracts, vol. 31, p. 1015[5] (1937).
Chemical Abstracts, vol. 70, article 4256f (1969).

TOBIAS E. LEVOW, Primary Examiner

H. M. S. SNEED, Assistant Examiner

U.S. Cl. X.R.

260—520, 999